United States Patent [19]
Yasunaga et al.

[11] Patent Number: 4,956,229
[45] Date of Patent: Sep. 11, 1990

[54] MAGNETIC RECORDING MEDIUM
[75] Inventors: Tadashi Yasunaga; Akio Yanai; Koji Sasazawa; Makoto Nagao, all of Kanagawa, Japan
[73] Assignee: Fuji Photo Film Co., Ltd., Kanagawa, Japan
[21] Appl. No.: 175,466
[22] Filed: Mar. 30, 1988
[30] Foreign Application Priority Data
Mar. 30, 1987 [JP] Japan .................................. 62-76589
[51] Int. Cl.$^5$ ............................................. G11B 23/00
[52] U.S. Cl. .................... 428/336; 427/132; 428/694; 428/900
[58] Field of Search ....................... 428/694, 900, 336; 427/128, 132
[56] References Cited
U.S. PATENT DOCUMENTS 4,452,857  6/1984  Yamazaki et al. .................. 428/900
4,567,116  1/1986  Sawada et al. ..................... 428/900
4,661,418  4/1987  Yanai et al. ....................... 428/900
4,673,610  6/1987  Shirahata et al. .................. 428/694
4,791,021  12/1988  Honda et al. ...................... 428/694
4,801,500  1/1989  Yasunaga et al. .................. 428/336

FOREIGN PATENT DOCUMENTS 59-207426  11/1984  Japan .
61-54023  3/1986  Japan .

Primary Examiner—Paul J. Thibodeau
Attorney, Agent, or Firm—Sughrue, Mion, Zinn, Macpeak & Seas

[57] ABSTRACT

A durable, rust- and scratch-resistant magnetic recording medium coated thereon a thin ferromagnetic film comprising an iron oxide nitride, wherein said film is an aggregation of pillar particles of said iron oxide nitride, said particles having a higher nitrogen content on their surface than inside the particles.

5 Claims, 1 Drawing Sheet

MAGNETIC RECORDING MEDIUM

FIELD OF THE INVENTION

The present invention relates to a magnetic recording medium, and more particularly it relates to a magnetic recording medium of a thin metal film type that does not generate rust and has good scratch resistance at low humidity.

BACKGROUND OF THE INVENTION

Coated-type magnetic recording media prepared by coating a magnetic coating composition having ferromagnetic particles and an organic binder onto a non-magnetic support and drying it have widely been used. However, these magnetic recording media have a low saturation magnetization because the metal oxide particles are mainly used as ferromagnetic particles and the density of ferromagnetic particles contained in the magnetic layer can not be increased because of the amount of organic binder contained therein. Also, the manufacturing steps are complicated. Therefore, these types of recording media are not suitable for high density recording.

With the increased demand for high density recording in recent years, a magnetic recording medium comprising a thin metal film on a non-magnetic support has been developed. The above magnetic recording medium is prepared by forming a thin metal film onto a non-magnetic support by a vapor deposition method such as vacuum deposition, sputtering or ion plating, or a plating method such as electroplating or electroless plating.

The magnetic composition is not limited to metals, but metals are typical examples of magnetic compositions. Therefore, the above magnetic recording medium is alternatively referred to as a magnetic recording medium of a thin metal film type, or is called a magnetic recording medium of a non-binder type because such a magnetic recording medium does not contain an organic binder.

The magnetic recording medium of a thin metal film type has recently drawn much attention. Since the thin metal film is made of ferromagnetic metals having high saturation magnetization and does not contain a binder, a higher coercive force can be obtained, the thickness of the film can be reduced and the influence of demagnetization at the short wave length region is slight. Thus, high density recording can be realized and manufacturing steps are simplified.

The thin metal film of the magnetic recording medium appears to have a uniform and smooth metal surface; however, microscopically it has such a rough structure that the metal particles align and the film easily corrodes. Thus, the magnetic recording medium of the thin metal film type has poorer weather resistance and corrosion resistance than the magnetic recording medium of a coated type. The surface of the magnetic recording medium used particularly for a cassette tape and a video tape is rubbed by a magnetic head upon recording and reproducing. When even a slight corrosion is present on the surface of a thin metal film, it drops off upon friction, causing head clogging, whereby both a head and a magnetic recording medium are damaged.

The magnetic recording medium of a thin metal film type also has poor durability. Due to the smoothness of the thin metal film, friction is large and stick-slip readily takes place. Still durability of the medium on a VTR is also poorer than the recording medium of a coated type.

In order to improve weather resistance and durability of the magnetic recording medium of the thin metal film type, a method of providing nitrogenation treatment by ion plating (Japanese Patent Application (OPI) No. 33806/75), a method of providing a silicon nitride film by sputtering (Japanese Patent Application (OPI) No. 30304/78), a method of forming a non-magnetic surface layer by exposing a magnetic film to the discharge in the atmosphere of nitrogen gas (Japanese Patent Application (OPI) No. 85403/78) and a method of providing a nitrogenated thin metal film on a thin magnetic metal film (Japanese Patent Application (OPI) No. 143111/79) have been developed. The term "OPI" as used herein means an unexamined published application.

A thin magnetic film composed of iron nitride or of iron and iron nitride is known as a magnetic recording medium of a non-binder type having excellent weather resistance, as disclosed in European Pat. No. 8,328 and Japanese Patent Application (OPI) No. 87809/84. One of the present inventors, with others, earlier proposed a magnetic recording medium comprising a non-magnetic support having provided thereon a thin magnetic film mainly composed of iron oxide nitride (Japanese Patent Application (OPI) No. 54023/86). The iron oxide nitride has a composition as represented by formula (I)

$$Fe_{1-x-y}N_xO_y \ (0.25 \leq x+y < 0.60) \qquad (I)$$

In accordance with the above-described method, weather resistance is greatly improved and durability is also improved to some extent by providing an iron oxide nitride layer. However, there are still problems in that scratch resistance at a low humidity is poor and the magnetic layer is fragile.

SUMMARY OF THE INVENTION

An object of the present invention is to provide a magnetic recording medium composed of a thin iron oxide nitride film having excellent scratch resistance at a low humidity.

The magnetic recording medium of the present invention has a thin magnetic layer composed of iron oxide nitride containing iron, nitrogen and oxygen, which is an aggregation of pillar particles. The distribution of the elements inside the pillar particles were studied and the above described problems have been solved.

That is, the present invention relates to a magnetic recording medium comprising a non-magnetic support having provided thereon a magnetic layer of a thin ferromagnetic film comprising iron, nitrogen and oxygen, said thin ferromagnetic film being an aggregation of pillar particles and the content of nitrogen on the surface of said pillar particles being higher than that inside of the pillar particles.

DETAILED DESCRIPTION OF THE INVENTION

Figure 1:
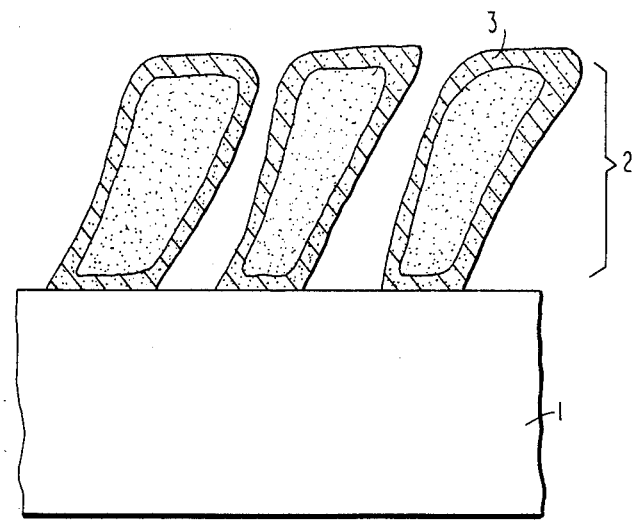
FIG. 1 is a diagram showing a magnetic recording medium of the present invention.

The magnetic layer of a thin ferromagnetic film of the present invention comprising iron, nitrogen and oxygen is a complex mixture. For example, as to iron nitride, it has a crystal structure such as $\epsilon\text{-}F_{2-3}N$, $\gamma\text{-}Fe_4N$ and $Fe_{16}N$. The magnetic layer preferably contains 2 to 30 atomic % of nitrogen and 2 to 30 atomic % of oxygen, and more preferably 4 to 20 atomic % of nitrogen and 5 to 20 atomic % of oxygen. When cobalt and nickel are included in the film as additional elements, the oxides thereof and nitride thereof are also included. In this case, it is preferred that iron is included in an amount of 50 wt % or more in metal content. In the present invention, a thin magnetic film is composed of an aggregation of pillar particles, which can be confirmed, for example, by observing a magnetic film vertically by a scan type electron microscope, or by observing an extremely thin piece of the vertically sliced thin film by a transmission-type electron microscope. In accordance with the theory of B. A. Movchan et al, a thin film prepared by sputtering has various configurations such as fibrous structure and porous structure, other than aggregation of pillar particles, depending upon sputtering conditions, and the theory is also applicable to a thin film prepared by vacuum deposition. A thin film having the fibrous structure does not exhibit a high coercive force and one having the porous structure has a reduced saturation magnetization and a poor film strength. Accordingly, the aggregation pillar particle shape as shown in FIG. 1 is the most suitable for the magnetic recording medium and is used in the present invention. A thin film composed of the aggregated pillar particles exhibits a high coercive force as each pillar nearly functions as a unit magnetic domain. It is preferred that each pillar particle does not weld together.

The present inventors have also found that excellent characteristics of a magnetic recording medium can be obtained when nitrogen atoms are locally (not uniformly) present in the pillar particle; that is, the nitrogen content at the surface of the pillar particle is higher than that inside the particle. Regarding the oxygen content, oxygen may be present uniformly throughout the pillar particle or the oxygen content may be the same as that of nitrogen, that is, oxygen content can be non-uniform in the pillar particle. The above structure of the particle can be confirmed, for example, by analyzing the elemental content on the surface and inside of the pillar particle by Micro.Auger Electron Spectroscopy using a sample of a thin film which is vertically sliced by a microtome. The sliced piece of a thin film is diagramically shown in FIG. 1. In the pillar particle 2 provided on a support 1, the content of nitrogen is higher on the surface region 3 of the particle than inside the particle. The surface region is preferably a region of from 0 (i.e., the outer surface of pillar particle) to about 50 Å (in depth direction) and more preferably from 0 to about 10 Å.

There are various methods for preparing pillar particles of the present invention. The conditions of preparation vary depending upon the apparatus used. For example, the pillar particles of the present invention can be obtained by a vacuum deposition method wherein vaporized iron and ion beams of a mixture of nitrogen and oxygen are simultaneously shot at the support at an incident angle other than 0°, preferably of 25° to 85° while the support is heated.

The thin metal magnetic layer of the present invention generally has a thickness of from about 0.02 to about 5.0 μm, preferably from 0.05 to 2.0 μm.

The suitable non-magnetic supports used in the present invention include plastic supports such as polyethylene terephthalate, polyimide, polyamide, polyvinyl chloride, cellulose triacetate and polycarbonate.

A lubricating layer may be provided on the magnetic layer of a magnetic recording medium in the present invention. Suitable lubricating agents include fatty acids having from 12 to 18 carbon atoms and metal salts thereof, silicone oils and fatty acid esters composed of monobasic fatty acids having from 2 to 20 carbon atoms and monohydric alcohols having from 3 to 12 carbon atoms. The amount of lubricant added is from about 0.5 to about 20 mg/m$^2$.

If necessary, a backing layer may be provided on the surface of the non-magnetic support on the opposite surface to the magnetic layer.

A layer composed of organic substances or inorganic substances may be provided between a magnetic layer of a thin metal film and a non-magnetic support.

The present invention will be illustrated in more detail with reference to the Example, but should not be limited thereto.

Unless otherwise indicated herein, all parts, percents, ratios and the like are by weight.

EXAMPLE

Figure 2:
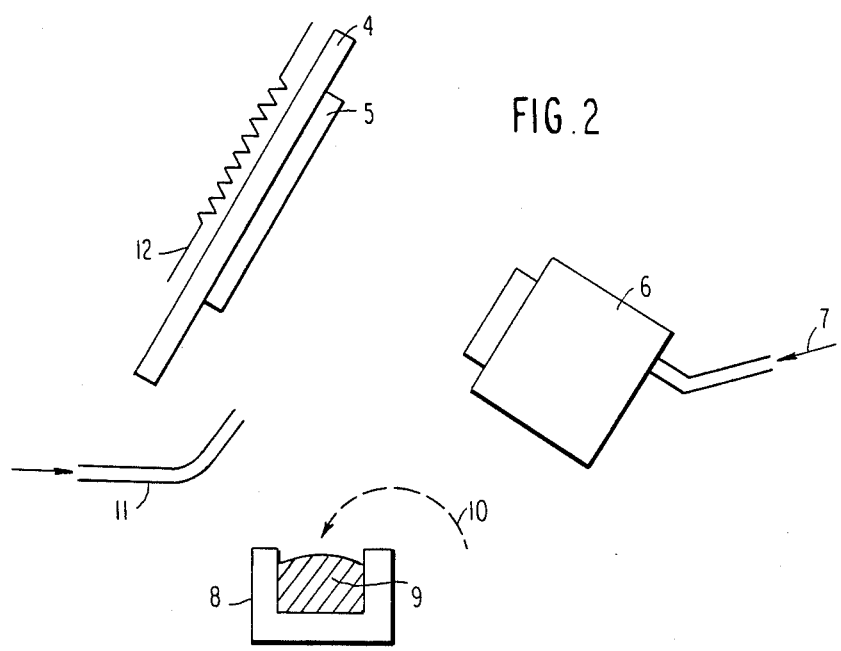
FIG. 2 is an exemplary apparatus used for forming a magnetic recording medium of the present invention.

A thin magnetic film was prepared using an apparatus shown in FIG. 2. A polyimide film (thickness 13 μm) was used as a support 5 which was mounted on support holder 4 equipped with heating means 12. Fe materials 9 (purity 99.9%) placed in crucible 8 was melted by heating with electron beams 10 to vapor, and was deposited on the support at an incident angle of 80°. At the same time, the vaporizing rate was monitored by a crystal oscillating film thickness monitor (not shown) and was controlled so that the rate was constant at 5 Å/S. Further, $N_2$ 50 vol % and $O_2$ 50 vol % as gas 7 were introduced into ion gun 6 and the ion gun was started to operate. (In FIG. 2, the numeral 11 is a gas-introducing inlet from which $O_2$ may be introduced.) The accelerating voltage was 0.3 kV, ion electric current value was 5 mA and the chamber pressure was $3 \times 10^{-5}$ Torr. Thus, a film having a 2000 Å thickness was obtained.

At this time, a support holder 1 was kept at a normal temperature. The film obtained was identified as Sample A.

Another thin film was prepared under the same conditions as above except that the support was heated at 140° C. so that chamber pressure slightly changed due to release of gas from the heated support, etc. The film obtained was identified as Sample B.

It was confirmed by using a Micro Auger apparatus that Sample B had a particulate structure in which nitrogen was present locally at the surface of the particles.

Still durability at 23° C. and 10% RH was tested using samples of a thin film which were cut into 8 mm × 100 mm pieces and attached with a leader tape at the both ends of samples. A modified device of FUJIX-8 manufactured by Fuji Photo Film Co., Ltd. was used as a testing machine. It was found that Sample B had 60 minutes or more where as Sample A had only 15 minutes. Sample B exhibited improved scratch resistance at a low humidity.

Therefore, the magnetic recording medium of the present invention is a magnetic recording medium of a thin iron oxide nitride type film having excellent rust resistance and having improved still durability at a low humidity.

While the invention has been described in detail and with reference to specific embodiments thereof, it will be apparent to one skilled in the art that various changes and modifications can be made therein without departing from the spirit and scope thereof.

What is claimed is:

1. A durable, rust and scratch-resistant magnetic recording medium comprising a non-magnetic support having provided thereon a thin ferromagnetic film layer comprising iron oxide nitride, said thin ferromagnetic film being an aggregation of pillar particles of said iron oxide nitride and the content of nitrogen on the surface of each of said pillar particles being higher than that inside each of said pillar particles.

2. A magnetic recording medium according to claim 1, wherein the ferromagnetic film layer has a thickness of from about 0.02 μm to about 5.0 μm.

3. A magnetic recording medium according to claim 2, wherein said thickness is from about 0.05 μm to about 2.0 μm.

4. A magnetic recording medium according to claim 1, wherein the iron oxide nitride is represented by the formula:

$$Fe_{1-x-y}N_xO_y$$

wherein $0.25 \leq x+y < 0.60$.

5. A magnetic recording medium according to claim 1, wherein said ferromagnetic film layer additionally contains at least one of cobalt or nickel.

* * * * *